United States Patent [19]

Koken et al.

[11] Patent Number: 4,576,345

[45] Date of Patent: Mar. 18, 1986

[54] MAGNETIC-TAPE CASSETTE WITH A LATCHING COVER PLATE

[75] Inventors: Karel G. M. Koken; Hubertus F. W. van de Kerkhof; John C. J. Olierook; Cornelis M. Be ersbergen van Henegouwen, all of Eindhoven, Netherlands

[73] Assignee: U.S. Philips Corporation, New York, N.Y.

[21] Appl. No.: 717,766

[22] Filed: Mar. 29, 1985

Related U.S. Application Data

[63] Continuation-in-part of Ser. No. 623,587, Jun. 22, 1984, abandoned.

[30] Foreign Application Priority Data

Apr. 2, 1984 [NL] Netherlands ............................ 8401028

[51] Int. Cl.$^4$ ............................................. G11B 23/04
[52] U.S. Cl. .................................................. 242/198
[58] Field of Search ............. 242/198, 199, 197, 71.1, 242/55.19 A; 360/132, 60, 66; 352/72, 75, 76, 78 R; 206/1.5; 220/315, 337, 338

[56] References Cited

U.S. PATENT DOCUMENTS

| | | | |
|---|---|---|---|
| 2,941,741 | 6/1960 | Bilsback | 242/199 |
| 3,627,225 | 12/1971 | Badum et al. | 242/197 X |
| 3,980,255 | 9/1976 | Serizawa | 242/198 |
| 3,987,489 | 10/1976 | Schoettle et al. | 242/199 X |
| 4,021,006 | 5/1977 | Morimoto et al. | 242/199 |
| 4,235,395 | 11/1980 | Wardenaar et al. | 242/199 |
| 4,254,922 | 3/1981 | Wolf et al. | 242/197 X |

FOREIGN PATENT DOCUMENTS

53-511 4/1979 Japan ................................... 242/197

Primary Examiner—Stanley N. Gilreath
Attorney, Agent, or Firm—David R. Treacy

[57] ABSTRACT

A magnetic-tape cassette has a front opening (7) which when the cassette is not in use is covered by a pivotal front cover (20) and a sliding plate (9) which is situated on the outside of the cassette housing (1) adjacent the bottom wall (2) thereof. In the closed position the sliding plate covers the front opening (7) at the bottom and a part of the magnetic tape (18a) which extends across said opening. The top wall (3) of the housing is imperforate and is contiguous with the front cover in the closed position of the cover. In the closed position the sliding plate (9) extends from the front of the cassette housing (1) beyond openings (4) in the bottom wall (2) to cover these openings. The sliding plate is formed with two apertures (15) which expose the openings (4) in the open position of the sliding plate (9). In the closed position the sliding plate (9) is latched by means of at least one latching member (27) which comprises a latching portion (29) and an actuating portion (30), the latter projecting into a slot or groove (32) in the sliding plate (9) near the rear end of the slot or groove when this plate (9) is in the closed position.

19 Claims, 8 Drawing Figures

MAGNETIC-TAPE CASSETTE WITH A LATCHING COVER PLATE

This application is a continuation-in-part application of my copending application Ser. No. 623,587 filed June 22, 1984 now abandoned.

BACKGROUND OF THE INVENTION

The invention relates to a magnetic-tape cassette comprising: a housing having first and second major walls which are parallel to one another, two side walls, a rear wall, an opening at the front which extends back into the first major wall, and a partition which separates this front opening from the interior of the housing; two reel hubs supported between the major walls so as to be rotatable about axes which extend perpendicularly to the major walls, the first major wall having two openings through which the drive spindles of a magnetic-tape-cassette apparatus can be coupled to the reel hubs, and a magnetic tape wound around the reel hubs with a part of the tape extending across the front opening; a front cover movable between closed and open positions and comprising a main portion which in the closed position of the front cover covers the front opening and the part of the magnetic tape which extends across the front opening, and side flanges which are situated one adjacent each side wall of the housing and which are pivotally connected to said side walls; and a sliding plate which is situated on the outside of the housing and which comprises a main portion which is situated adjacent the first major wall of the housing, the sliding plate being slidably guided on the housing for movement parallel to the first major wall towards the rear wall, from a closed position in which it latches the front cover in the closed position and in which the main portion of the sliding plate covers the front opening where this opening extends back into the first major wall, to an open position to unlatch the front cover and to give access to the front opening for the passage thereinto of tape-withdrawal means of a magnetic-tape-cassette apparatus.

Such a magnetic-tape cassette is disclosed in U.S. Pat. No. 4,235,395. This known cassette, which is referred as a V-2000 cassette, has a front opening which is covered by the front cover at the front and by a sliding plate at the sides of the two major walls. In the closed position of the front cover and the sliding plate the cassette is thus protected against the penetration of dirt and against mechanical damage, which may be particularly detrimental to the taut part of the magnetic tape which extends across the front opening. In the closed position the sliding plate also constitutes a latch for the front cover, so that the front cover cannot be opened inadvertently while the cassette is being handled by the user. However, since the sliding plates can be displaced freely from the closed position towards the rear, it may happen that the front cover is accidentally swung open by the user after the sliding plate has been slid rearwards, so that the part of the magnetic tape which extends across the front opening may be damaged. Furthermore, dirt may penetrate the interior of the cassette housing because under specific conditions the interior of the known cassette is not perfectly sealed at the location of the openings in the two major walls.

SUMMARY OF THE INVENTION

The object of the invention is to construct a cassette of the kind specified in the opening paragraph in such a manner that it can be closed completely and that the parts used for closing the cassette can be latched effectively in the closed position.

To this end the invention is characterized in that the second major wall is imperforate over its entire area and the main portion of the front cover is contiguous with this wall in the closed position of said cover; and in that the main portion of the sliding plate extends rearwardly beyond the openings in the first major wall in the closed position of the sliding plate to cover said openings, and has two apertures which expose said openings when the sliding plate is in the open position, the sliding plate being latched in the closed position by at least one latching member which comprises a latching portion and an actuating portion. The main portion of the sliding plate is provided with a slot or groove which extends rearwardly from the front edge of the main portion of the plate, and the actuating projection is near the rear end thereof in the closed position of the sliding plate.

This results in a cassette which is always fully closed at the side of the second major wall and which can be closed by the sliding plate at the side of the first major wall. The sliding plate is latched by the latching member, which also latches the front cover via the sliding plate. The separate latching portion and actuating portion of the latching member provide more freedom as regards the construction of the unlatching means on the magnetic-tape-cassette apparatus. The slot or groove in the main portion of the sliding plate gives the advantage that these unlatching means can actuate the actuating portion through the sliding movement with which the cassette is inserted into the apparatus. The shape of the latching portion may be adapted specifically to the latching function, so that a more reliable latching of the sliding plate can be achieved. In practice, the actuating portion in conjunction with the slot or groove virtually preclude an inadvertent opening of the sliding plate and hence of the front cover; the sliding plate can be unlatched only by the unlatching means in the magnetic-tape-cassette apparatus. In the open position the sliding plate, when the cassette is in use, occupies hardly any additional space in the magnetic-tape-cassette apparatus.

The magnetic-tape cassette in accordance with the invention is suitable for use in magnetic audio, video and data recorders. Since the construction in accordance with the invention may be utilized advantageously in small cassettes the invention is particularly suitable for magnetic-tape cassettes intended for digital audio recording, from which cassettes the magnetic tape is withdrawn and wrapped around a rotary drum.

A preferred embodiment of the invention is characterized in that the latching portion and the actuating portion are situated near the free end of a resilient arm which is connected at the other end to the first major wall and whose free end is movable substantially perpendicularly to the plane of the first major wall. This enables the sliding plate to be latched effectively by means of the latching member. Moreover, the unlatching means of the magnetic-tape-cassette apparatus can move the latching portion out of the latched position by lifting the actuating portion against spring force. The resilient arm enables the spring force which acts on the latching portion to be determined by the choice of the length and/or the thickness of the arm or by the use of local constrictions or recesses in the arm.

Another preferred embodiment of the invention is characterized in that the latching portion, the actuating portion and the resilient arm form an integral unit with the first major wall. This results in a latching member which is integral with the first major wall, so that the number of separate parts employed in the construction of the cassette in accordance with the invention can be minimized.

A further preferred embodiment of the invention is characterized in that the actuating portion has a rounded or pyramidal profile, the latching portion has a rectangular shape and the actuating portion is situated adjacent the latching portion in a direction transverse to the direction of movement of the sliding plate. This profile of the actuating portion ensures a smooth cooperation between the actuating portion and the unlatching means on the apparatus and the shape of the adjacent latching portion is adapted specifically to the latching function.

It is of advantage if in the closed position of the sliding plate the latching portion is cooperable with a wall of a hole in the inner surface of the sliding plate to latch the sliding plate in the closed position. This ensures that the latching portion itself is not accessible in the closed position of the sliding plate.

Manual unlatching of the sliding plate by a user becomes practically impossible, if the cassette includes two latching members as described above, disposed in the first major wall each near a respective side wall. The sliding plate can then be unlatched only by simultaneous unlatching of the two members, for example by an apparatus having a duplicate set of latching means, one for each of the latching members.

Yet another preferred embodiment of the invention is characterized in that the front cover has a recess in an edge of its main portion, which recess is disposed in line with the slot or groove in the main portion of the sliding plate when the front cover is in the closed position. If the magnetic-tape cassette is inserted into the apparatus with a sliding movement this has the advantage that the unlatching means can enter the slot or groove in the main portion of the sliding plate to unlatch the plate without being obstructed by the front cover.

A satisfactory guidance for the sliding plate is obtained if the sliding plate comprises side portions which adjoin the main portion and are situated one adjacent each side wall of the housing and which are each guided in a groove in the adjacent side wall. These grooves also connect the sliding plate to the housing of the cassette in an effective manner. In this respect a further preferred embodiment is characterized in that, in the closed position of the sliding plate, the side portions thereof cooperate with the side flanges of the front cover to latch this cover in the closed position. By utilizing the side portions of the sliding plates to latch the front cover, no special parts are required for this purpose.

Two embodiments of the invention will now be described in more detail, by way of example, with reference to the drawings.

DESCRIPTION OF THE PREFERRED EMBODIMENTS

Figure 1:
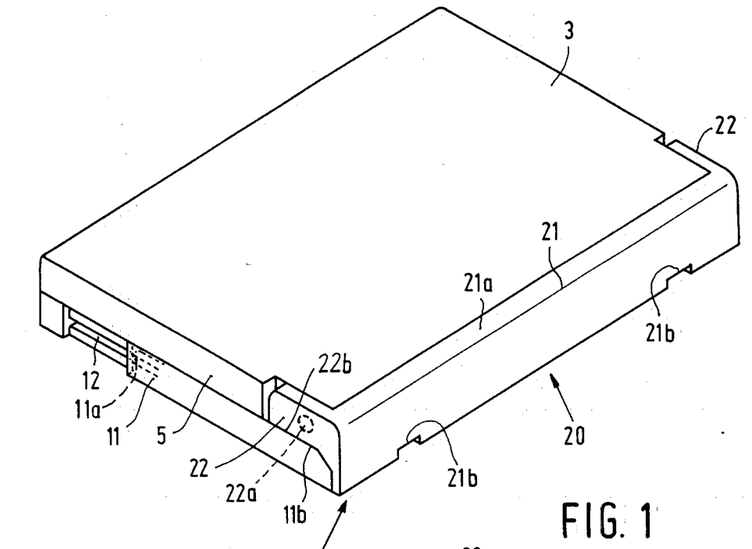
FIG. 1 is a perspective view of a magnetic-tape cassette constructed in accordance with the invention, showing the front cover and the sliding plate in their closed positions.
Figure 2:
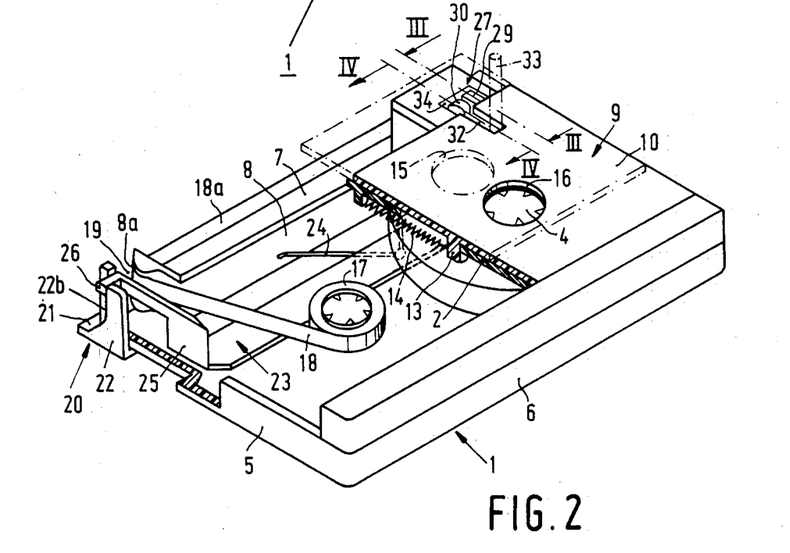
FIG. 2 is a perspective view of the underside of the cassette of FIG. 1 partly cut away, showing the front cover and the sliding plate in their open positions.

The magnetic-tape cassette shown in FIGS. 1 and 2 comprises a housing 1 having two parallel, substantially rectangular major walls, namely, a first major wall 2 (FIG. 2) and a second major wall 3 (FIG. 1). The major wall 2 constitutes the bottom wall of the housing and is formed with two circular openings 4, of which FIG. 2 shows only the right-hand opening. The other major wall 3 is imperforate. The cassette housing 1 also comprises two side walls 5 and a rear wall 6 and at the front has an opening 7 which at the bottom extends back into the first major wall 2 and which is separated from the interior of the housing 1 by a partition 8. A sliding plate 9 is slidable on the first major wall 2 and comprises a main portion 10, which lies against the first major wall 2 in a plane parallel to the plane of this wall, and two side portions 11 which adjoin the main portion and which are situated one adjacent each side wall 5. Each side portion 11 is provided on its inner side with a ridge 11a which fits slidably in a groove 12 in the outer side of the adjacent side wall 5 to guide the sliding plate 9 and at the same time connect it to the housing 1. Thus, the sliding plate is slidable relative to the cassette housing between a closed position, shown in full lines in FIG. 2, in which it covers the front opening of the cassette housing at the bottom, and an open position, shown in dot-dash lines, in which the front opening is exposed at the bottom to permit the entry of tape-withdrawal means of a magnetic-tape-cassette apparatus, not shown, into the opening. On its inner side the sliding plate 9 comprises a projection 13 which is slidable in a slot (not shown) in the first major wall 2 in a direction perpendicular to the rear wall 6 and to which is connected one end of a tension spring 14 whose other end is secured to the inner side of the first major wall 2, the tension spring 14 constituting resilient means which urge the sliding plate 9 towards the closed position. In the main portion 10 of the sliding plate 9 are two apertures 15 which in the open position of the sliding plate (FIG. 2) are coaxial with the openings 4 in the major wall 2 to allow drive spindles, not shown, of a magnetic-tape-cassette apparatus to enter the cassette housing through the openings 4.

In the interior of the housing 1 two reel hubs 16 and 17 are supported between the major walls 2 and 3 to be rotatable about axes which extend perpendicularly to the major walls. A magnetic tape 18 is wound around the reel hubs, a part 18a of the tape extending tautly across the front opening 7. The partition 8 is formed at its ends with cylindrically curved convex tape guides 8a, of which the left-hand tape guide is visible in FIG. 2. Each tape guide 8a and a portion of the adjacent side wall 5 at the front end thereof bounds a passage 19 through which the magnetic tape 8 passes from the interior of the housing 1 to extend across the front opening 7. When the cassette is not in use, that is to say, when it is not inserted in a magnetic-tape-cassette apparatus, the front opening 7, the portion 18a of the magnetic tape which extends across this opening, and the two passages 19 are all covered at the front by a front cover 20, which cover comprises an elongate main portion 21 and two side flanges 22 at the ends of the main portion. The side flanges 22 are pivotally connected to the respective side walls 5 of the housing by pivot pins 22a. As shown in FIG. 1, the main portion 21 of the front cover has a flange or lip 21a along its upper edge which when the cover is closed is substantially contiguous and coplanar with the second major wall 3 of the housing 1. Similarly, when the front cover is closed, the side flanges 22 thereof are substantially contiguous and coplanar with the side portions 11 of the sliding plate 9. Thus, the magnetic-tape cassette is closed correctly.

Situated inside the housing 1, adjacent the major wall 3 is an elongate brake plate 23 which is movable in a plane parallel to the plane of the wall 3 and is urged towards the rear wall 6 by a spring 24 which bears against the partition 8. When it is not in use the brake plate 23 bears under the influence of the spring 24 against the circumferential surfaces of the reel hubs 16 and 17 to inhibit rotation of the reel hubs and thereby ensure that the tape 18 remains taut across the front opening 7 of the cassette housing. The brake plate 23 extends across the cassette housing from side wall to side wall, and adjacent these walls it has right-angled side portions 25 which are each provided with a projection 26 which extends through a slot (not shown) in the adjacent side wall 5. The projections 26 are slidable in these slots and are covered by the side portions 11 of the sliding plate 9 in the closed position of the plate. Thus, the projection 26 cannot be actuated when the sliding plate 9 is closed. However, when the sliding plate has been slid back into the open position shown in full lines in FIG. 2, the projections 26 are exposed and can cooperate with edge portions 22b of the side flanges 22 of the front cover 20 so that the brake plate 23 is moved forwards by the flanges 22 when the front cover 20 is pivoted to the open position. Thus, when the front cover 20 is swung open the brake plate 23 is disengaged from the reel hubs 16 and 17.

As shown in FIG. 1, in the closed position of the sliding plate 9 an edge portion 11b of each side portion 11 of the sliding plate is contiguous with the edge portion 22b of the adjacent side flange 22 of the front cover 20 so that the front cover is latched in the closed position. When the sliding plate 9 is slid rearwardly to the open position shown in full lines in FIG. 2, the side portions 11 of the plate are moved back to free the cover flanges 22 for pivotal movement so that the front cover is unlatched and can be swung open.

Figure 3:
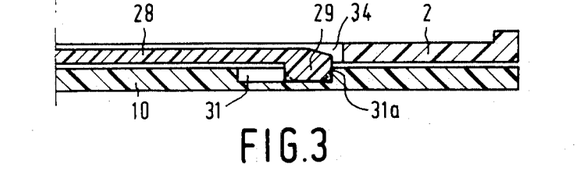
FIG. 3 is a sectional view taken on the line III—III in FIG. 2 and drawn to an enlarged scale, showing the sliding plate latched in the closed position.
Figure 4:
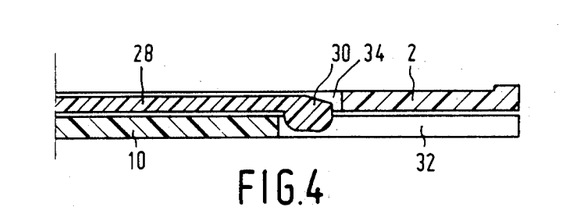
FIG. 4 is a sectional view taken on the line IV—IV in FIG. 2, showing the sliding plate in the same position as in FIG. 3.
Figure 5:
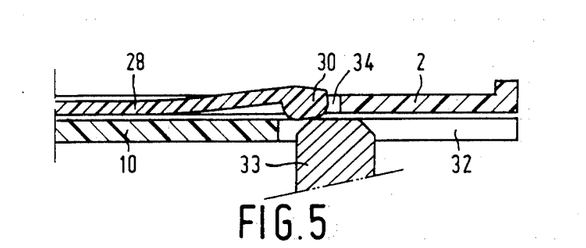
FIG. 5 is a sectional view taken on the line IV—IV in FIG. 2, showing the actuating portion of the latching member lifted by the unlatching means of a magnetic-tape-cassette apparatus.
Figure 6:
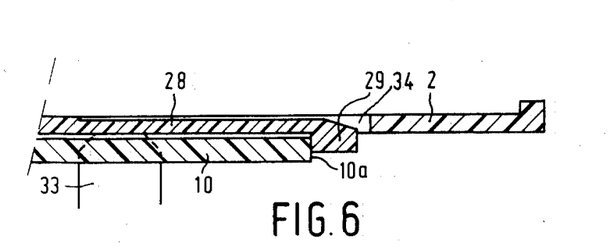
FIG. 6 is a sectional view taken on the line III—III in FIG. 2, showing the sliding plate latched in the open position by the latching portion of the latching member.

In the first major wall 2 two latching members 27 are arranged, of which only the right-hand latching member is shown in FIG. 2. The latching members 27 are arranged mirror symmetrically relative to a plane which extends perpendicularly to the major walls and perpendicularly to a plane containing the rotational axes of the reel hubs 16 and 17 and which is situated at equal distances from the reel hubs 16 and 17. The latching members 27 are formed integrally with the major wall 2 and are each situated in an associated aperture 34 in this wall near one of the side walls 5 and a short distance to the rear of the passage 19 bounded by that side wall. The latching members 27 each comprise a resilient arm 28 which lies in the plane of the major wall 2 and extends in the direction of movement of the sliding plate 9. The arm is connected at its rear end to the wall 2 and is formed at its forward end with a latching portion 29 (FIG. 3) and an actuating portion 30 (FIG. 4) which are disposed side-by-side on the arm 28 as one integral projection and which both project from the plane of the first major wall 2 on the outer (lower) side thereof, as shown in FIGS. 3 and 4 respectively. As shown in FIG. 3, in the closed position of the sliding plate 9 the latching portion 29 of each latching member cooperates with an end wall 31a of an associated hole formed by a groove 31 in the inner surface of the sliding plate 9, which groove 31 extends in a direction perpendicular to the rear wall 6 to latch the plate 9 in the closed position. In the open position of the sliding plate 9 the latching portion 29 cooperates with the front edge 10a of the main portion 10 of the sliding plate 9, as shown in FIG. 6, to latch the plate in this position. In order to ensure that both functions are performed correctly and that the sliding plate 9 is latched securely in the closed position and in the open position, the front and rear faces of the latching portion 29 of each latching member, i.e., the faces which are cooperable with the sliding plate, extend at right angles to the parallel planes of the sliding plate and the major wall 2. Preferably the latching portion has a rectangular shape. In the closed position of the sliding plate 9 the actuating portion 30 of each latching member 27 projects into an associated slot 32 in the major portion 10 of the sliding plate 9. The slots 32 extend rearwardly from the front edge of the plate 9, and the portions 30 are situated near the rear ends of the slots in the closed position of the plate. When the cassette is slid into a magnetic-tape-cassette apparatus, each slot 32 receives an unlatching member provided on the apparatus, for example, the pin 33 shown in FIG. 5, and as the cassette moves forward the respective actuating portion 30 engages and slides over this member to be lifted thereby, the portion 30 having a rounded profile so that it can slide smoothly over the unlatching member. The resulting deflection of the resilient arms 28 of the latching members 27 lifts the latching portions 29 of these members out of the grooves 31 in the sliding plate 9 to unlatch the plate. It is to be noted that the spring force of the arms 28 can be determined by the choice of the length and the thickness of the arms. Moreover, it is to be noted that owing to the use of the arms 28 and the portions 29 and 30, no additional parts are required for latching the sliding plate 9.

As already stated, when the magnetic-tape cassette is not in use, the sliding plate 9 is in the closed position and covers the openings 4 in the bottom wall 2 of the cassette housing. It also closes the front opening 7 of the housing at the bottom so that the part 18a of the magnetic tape 18 is not accessible from the underside of the cassette housing. At the front the part 18a of the tape is covered by the main portion 21 of the closed front cover 20, whilst at the upper side an effective shielding is provided by the contiguity between the upper flange or lip 21a of the front cover 20 and the major wall 5 of the cassette housing. The latching members 27 ensure that the sliding plate 9 cannot be moved when the latching portions 29 are in the position shown in FIG. 3. When the cassette is not in a magnetic-tape-cassette apparatus, unlatching of the sliding plate 9 is very difficult because of the provision of the two latching members and because, due to the actuating portions 30 being situated in the comparatively narrow slots 32, it is difficult to depress these actuating portions with the fingers or fingernails. Thus, the cassette in accordance with the invention provides a very high degree of protection against inadvertent opening of the sliding plate 9. Latching of the sliding plate also results in the front cover 20 being latched, so that the front cover cannot be opened inadvertently either. Latching the front cover and the sliding plate together has the further advantage that the brake plate 23 cannot be actuated inadvertently, which ensures that the reel hubs cannot rotate when this is not desired.

Thus, when the sliding plate 9 and the front cover 20 are closed the magnetic-tape cassette in accordance with the invention forms a fully closed unit which is shielded effectively against the penetration of dust and dirt and also against mechanical influences which may lead to the magnetic tape in the cassette being damaged. It is to be noted that because of its exposed position the part 18a of the magnetic tape must be very well protected when the cassette is not in use. As already stated, it is necessary for this part of the magnetic tape to be exposed at the front opening 7 of the cassette housing when the cassette is inserted in a magnetic-tape-cassette apparatus in order to permit the tape-withdrawal means of the apparatus to withdraw the tape 18 and thread it around a head drum of the apparatus, so that recording or reading by the rotary magnetic heads in the head drum is possible. Such an apparatus which operates with a rotary head drum may be a video recorder; alternatively it may be an audio or data recorder which is intended for recording and/or reproducing signals in digital form. For the latter type of recorder only a comparatively small length of the magnetic tape is required. The cassette in accordance with the invention is particularly suitable for this purpose, because the parts used may be very compact.

To load the cassette into a magnetic-tape-cassette apparatus it may be necessary to insert the cassette into a loading mechanism in the apparatus. In that case the apparatus may be provided with a so-called "letter box" opening at the front. During the insertion of the cassette the unlatching members of the apparatus, which may be arranged stationarily in the loading mechanism, enter the slots 32 in the sliding plate 9 of the cassette through recesses 21b in the lower edge of the main portion 21 of the front cover 20 of the cassette (FIG. 1) which recesses 21b are disposed in line with the slots 32 when the front cover is in the closed position. It is to be noted that instead of the pins 33 the unlatching members may comprise ridges on the bottom of the loading mechanism into which the cassette is inserted. During insertion the unlatching members of the apparatus, as shown in FIG. 5 and as already described, lift the actuating portions 30 of the latching member 27 against the spring force of the arms 28, which are thereby deflected to disengage the latching projections 29 from the grooves 31 in the sliding plate 9 to unlatch the plate. The unlatching members 33 then abut the rear end walls of the slots 32 in the plate 9 so that as the cassette is inserted further the sliding plate 9 is held back by the unlatching members 33 to uncover the bottom of the front opening 7 of the cassette housing 1. During this movement the spring 14 is further tensioned. As they pass the front edge 10a of the main portion 10 of the sliding plate 9, the latching portions 29 snap down over the edge 10a into the position shown in FIG. 6, under the influence of the spring force of the arms 28 of the latching members 27. In this position the two latching portions 29 ensure that the sliding plate 9 is positioned correctly and is latched in this position. Thus, the unlatching members are no longer loaded when the sliding plate is in the open position so that they may be withdrawn in the operating position of the cassette. In the final position the sliding plate abuts a raised portion of the first major wall 2 at a small distance from the rear wall 6. In this position the apertures 15 give access to the openings 4 in the first major wall 2. Thus, the drive spindles of the magnetic-tape-cassette apparatus can readily engage in the reel hubs or the cassette can be lowered by the loading mechanism onto these drive spindles.

As already stated, the front cover 20 is unlatched by the rearward movement of the sliding plate. As a result of the downward movement of the loading mechanism of the apparatus the front cover is then swung open in known manner to the position shown in FIG. 2 and the brake plate 23 is moved forwards by the side flanges 22 of the front cover against the force of the spring 24 to release the reel humbs 16 and 17. From this instant the tape-withdrawal pins or like means of the apparatus, which now project up into the front opening 7 of the cassette housing, can withdraw a loop of the magnetic tape 18 from the cassette and thread it around the head drum. Now it is possible to make a recording on and/or to play back a recording from the tape 18.

When the cassette is withdrawn from the apparatus the actuating portions 30 of the latching members 27 are again lifted by the unlatching members 33 of the apparatus so that the latching portions 29 are disengaged from the front edge 10a of the main portion 10 of the sliding plate 9 to unlatch the plate. The spring 14 then returns the sliding plate to the position shown in FIGS. 3 and 4, in which position it is automatically latched by the latching portions 29. Prior to the return of the sliding plate 9 to the closed position the front cover 20 is swung back to the closed position under the combined influences of gravity and the force exerted on the brake plate 23 by the spring 24. The front cover 20 is latched in the closed position again by the side portions 11 of the sliding plate 9 when the plate is returned to the closed position.

Figure 7:
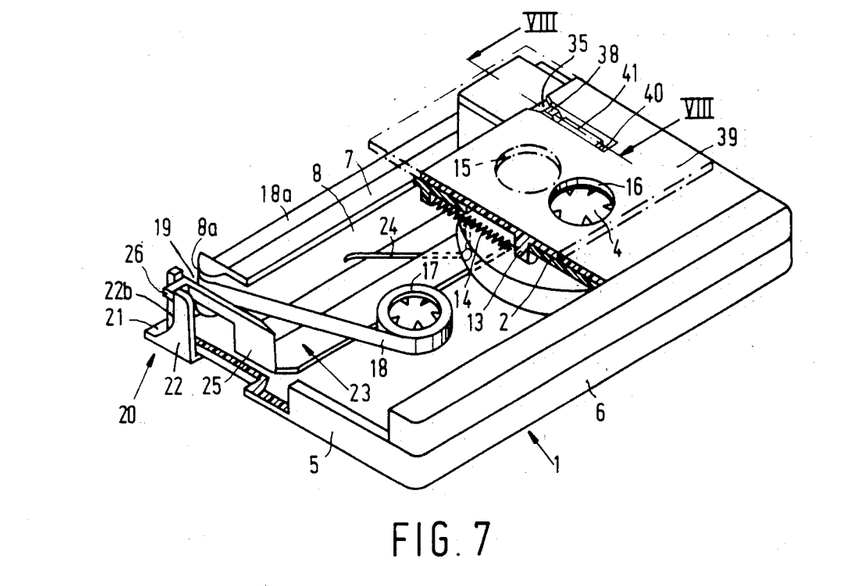
FIG. 7 is a perspective view of the underside of another embodiment of a magnetic-tape cassette in accordance with the invention, partly cut away, showing the front cover and the sliding plate in their open positions.
Figure 8:
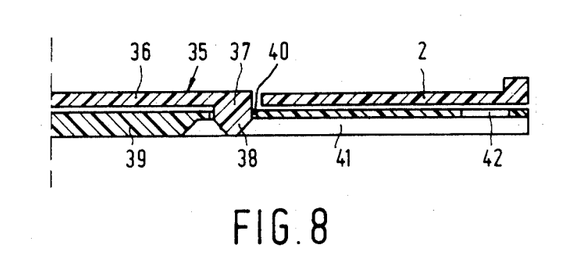
FIG. 8 is a sectional view taken on the lines VIII—VIII in FIG. 7 and drawn to an enlarged scale, showing the sliding plate latched in the closed position.

A second embodiment shown in FIGS. 7 and 8 comprises many parts which are already shown in the first embodiment and bear the same reference numerals. In this second embodiment two latching members 35 each comprise a resilient arm 36, provided with a latching portion 37 having a rectangular shape and an actuating portion 38, which is situated on the latching portion 37 and has a pyramidal profile. In the closed position of a sliding plate 39 the latching portions 37 each abut the wall of a hole 40 in the inner surface of the plate 39 and latch the plate 39. The actuating portion 38 projects into an associated groove 41 in plate 39, which groove 41 extends in the same direction as the slot 32 in the first embodiment. The hole 40 is situated in the bottom wall of the groove 41, and another hole 42 in this bottom wall is situated near the front edge of the sliding plate 39. In the open position of the plate 39 the latching portions 37 abut the wall of the hole 42 and latch the plate. Preferably, the side walls of the groove 41 diverge tunnel-shaped towards the main portion 21 of the front cover 20, whereas the main portion 21 is also provided with a recess 21b, disposed in line with the groove 41. During insertion of the cassette, shown in FIGS. 7 and 8, the grooves 41 receive the unlatching members 32 of the apparatus. Each member lifts the actuating portion 38, which is situated in the groove 41 adjacent the hole 40. Simultaneously pins on the apparatus (not shown) abut the edge of the plate 39 and urge the plate towards the rear wall. Due to this force the portion 38 with its pyramidal profile can slide smoothly over the edge of the hole 40 and the arm 36 is deflected until the portion 38 disengages the wall of the hole 40. This results in the sliding plate 39 being unlatched from the latching members 35. When the cassette is inserted further, the inner side of the plate 39 slides over the top of the portion 38 until the portions 37 and 38 snap into the hole 42 under the influence of the spring force of the arm 36. In this position of the plate 39, shown in FIG. 7, the latching portions 37 ensure that the sliding plate 39 is positioned correctly and is latched. When the cassette is withdrawn from the apparatus each actuating portion 38 is again lifted by the unlatching member 33 of the apparatus so that the portions 37 and 38 are disengaged from the wall of the hole 42 to unlatch the plate 39. The spring 14 then returns the plate 39 back to the position shown in FIG. 8, in which position it is automatically latched when the portions 37 and 38 snap into the hole 40. As the actuating portion 38 is arranged in the comparatively narrow groove 41 and the portion 38 does not extend above the plane of the sliding plate 39, it is difficult to depress the actuating portion 38 with the finger or fingernails, and so unlatching of the sliding plate 39 is very difficult when the cassette is not in the apparatus. Thus this embodiment of the cassette in accordance with the invention also provides a very high degree of protection against inadvertent opening of the sliding plate 39.

In an alternative embodiment, not shown, instead of the two latching members 27 or 35, only one latching member 27 or 35 is employed. It is also possible to employ the latching portion 29 or 37 of the or each latching member only for latching the sliding plate in the closed position. The sliding plate could be held in the open position by the unlatching member or members of the magnetic-tape-cassette apparatus. Alternatively, the sliding plate could be held in the open position by the pins, described in relation to the second embodiment of FIGS. 7 and 8, which urge the sliding plate towards the rear wall when the cassette is inserted.

What is claimed is:

1. A magnetic-tape cassette comprising: a housing having first and second major walls which are parallel to one another, two side walls, a rear wall, an opening at the front which extends back into the first major wall, and a partition which separates this front opening from the interior of the housing; two reel hubs supported between the major walls so as to be rotatable about axes which extend perpendicularly to the major walls, the first major wall having two openings through which the drive spindles of a magnetic-tape-cassette apparatus can be coupled to the reel hubs, and a magnetic tape being wound around the reel hubs with a part of the tape extending across the front opening; a front cover movable between closed and open positions and comprising a main portion which in the closed position of the front cover covers the front opening and the part of the magnetic tape which extends across the front opening, and side flanges which are situated one adjacent each side wall of the housing and which are pivotally connected to said side walls; and a sliding plate which is situated on the outside of the housing and which comprises a main portion which is situated adjacent the first major wall of the housing, the sliding plate being slidably guided on the housing for movement parallel to the first major wall towards the rear wall from a closed position in which it latches the front cover in the closed position and in which the main portion of the sliding plate covers the front opening where this opening extends back into the first major wall to an open position to unlatch the front cover and to give access to the front opening for the passage thereinto of tape-withdrawal means of a magnetic-tape-cassette apparatus, characterized in that the second major wall is imperforate over its entire area and the main portion of the front cover is contiguous with this wall in the closed position of said cover and in that the main portion of the sliding plate extends rearwardly beyond the openings in the first major wall in the closed position of the sliding plate to cover said openings and has two apertures which expose said openings when the sliding plate is in the open position, the sliding plate being latched in the closed position by at least one latching member which comprises a latching portion and an actuating portion, the main portion of the sliding plate being provided with a slot or groove which extends rearwardly from the front edge of the main portion of the plate, and the actuating portion being arranged to project into the slot or groove near the rear end thereof in the closed position of the sliding plate.

2. A magnetic-tape cassette as claimed in claim 1, characterized in that the latching portion and the actuating portion are situated near the free end of a resilient arm which is connected at the other end to the first major wall and whose free end is movable substantially perpendicularly to the plane of the first major wall.

3. A magnetic tape cassette as claimed in claim 2, characterized in that the latching portion, the actuating portion and the resilient arm form an integral unit with the first major wall.

4. A magnetic tape cassette as claimed in claim 2 or 3, characterized in that the resilient arm extends from its free end towards the rear wall.

5. A magnetic-tape cassette as claimed in claims 2 or 3, characterized in that the actuating portion has a rounded or pyramidal profile, the latching portion has a rectangular shape and the actuation position is situated adjacent the latching portion in a direction transverse to the direction of movement of the sliding plate.

6. A magnetic-tape cassette as claimed in claim 5, characterized in that the actuating portion is situated beside the latching portion on the resilient arm in a direction parallel to the sliding plate.

7. A magnetic-tape cassette as claimed in claim 5, characterized in that the actuating portion is situated on the latching portion, said portions being formed as one integral projection on the resilient arm.

8. A magnetic-tape cassette as claimed in claim 5, characterized in that in the closed position of the sliding plate the latching portion is cooperable with a wall of a hole in the inner surface of the sliding plate to latch the sliding plate in the closed position.

9. A magnetic-tape cassette as claimed in claim 8, characterized in that the hole is situated in the bottom-wall of the groove in the sliding plate; and said resilient arm includes an integral projection extending transversely to the direction of movement of the sliding plate, said actuating portion being situated on said latching portion, and said actuating and latching portions being portions of said integral projection.

10. A magnetic-tape cassette as claimed in claims 1, 2 or 3, characterized in that in the open position of the sliding plate the latching portion is cooperable with the front edge of the sliding plate to latch the sliding plate in the open position.

11. A magnetic-tape cassette as claimed in claim 9, characterized in that in the open position of the sliding plate the latching portion is cooperable with a wall of another hole in the bottom-wall of the groove in the sliding plate to latch the sliding plate in the open position, said another hole being situated near the front edge of the sliding plate.

12. A magnetic-tape cassette as claimed in claims 1, 2 or 3, characterized in that the front cover has a recess in an edge of its main portion, which recess is disposed in line with the slot or groove in the main portion of the sliding plate when the front cover is in the closed position.

13. A magnetic-tape cassette as claimed in claims 1, 2 or 3, characterized in that the sliding plate comprises side portions which adjoin the main portion and are situated one adjacent each side wall of the housing and which are each guided in a groove in the adjacent side wall.

14. A magnetic-tape cassette as claimed in claim 13, characterized in that in the closed positon of the sliding plate the side portions thereof cooperate with the side flanges of the front cover to latch this cover in the closed position.

15. A magnetic-tape cassette as claimed in claim 14, characterized in that when the sliding plate is moved towards the open position its side portions are moved away from the side flanges, thereof the front cover to unlatch this cover so that it can be swung open.

16. A cassette adapted for cooperation between an article in the cassette and parts of an apparatus, comprising
a cassette housing having first and second major walls on opposite sides of an interior space, said walls being arranged to define a front having an elongated opening extending in a first direction parallel at least to said first wall, and a further opening portion extending from said front opening back into said first major wall,
at least one reel hub disposed in said interior space, rotatable about an axis perpendicular to said first major wall and aligned with said spindle opening so as to be engageable by a spindle of said apparatus,
an elongated article wound around said hub, a portion of the elongated article extending along said front opening in a direction generally parallel to said first direction; said portion of the article being disposed and said further opening portion extending into said first major wall a distance sufficient to provide access for a part of said apparatus to pass between said portion of the article and said interior space,
a front cover having a main portion, said cover being connected to said housing and movable between a closed and an open position, in the closed position said main portion covering said front opening,
a sliding plate disposed on the outside of the housing, having a main portion adjacent to said first major wall, a spindle opening in said main portion, and a front edge,
means, responsive to the sliding plate position, for latching the front cover in the closed position, and
means for slidably guiding said plate parallel to said first major wall between an open position in which the respective spindle openings are aligned with each other to permit passage therethrough of a spindle on said apparatus for driving the reel hub; and a closed position in which said main portion covers at least part of said further opening portion in the first main wall, said front edge adjoins said front cover, and said sliding plate latches the front cover in the closed position,
characterized in that said second major wall is entirely imperforate,
in the closed position the main portion of the front cover is contiguous with said second major wall and said sliding plate main portion extends rearwardly beyond said at least one spindle opening in said first major wall,
said sliding plate has a slot extending rearwardly from the front edge of the main portion; and at least one spindle aperture which, in the open position of the sliding plate, is aligned axially with said at least one spindle opening in said first major wall and with said at least one reel axis, and
said cassette further comprises plate latching means for latching said sliding plate in the closed position, said plate latching means comprising at least one latching member having a latching portion and an actuating portion, the actuating portion being disposed so as to project into said slot near the rear end thereof when the sliding plate is in the closed position.

17. A cassette as claimed in claim 16, characterized in that said sliding plate main portion is substantially planar, and has a given thickness; said groove has a depth, extending from said outer surface toward the cassette interior, less than said given thickness; and said sliding plate has two latching openings therethrough communicating with said groove, and
said latching member has a resilient arm extending rearwardly from a point of connection to said first major wall, to a free end; at said free end, said latching member has an outwardly extending projection having a latching portion and an actuating portion, arranged such that in the open and in the closed positions said projection is aligned with a respective one of said holes communicating with the groove, said latching portion lying within said hole in the main portion and said actuating portion projecting into said groove, said actuating portion having front and rearward inclined surfaces so arranged that, upon engagement of said actuating portion by an element on an apparatus and displacement of said actuating portion toward the interior space of the cassette, a respective inclined surface is aligned with edges of the latching hole through the main portion of the sliding plate, whereby upon urging of the sliding plate toward the other one of said open and closed positions the edge of the latching hole engages the oblique surface and unlatches said latching member by deforming the resilient arm to move the projection out of the latching hole.

18. A cassette as claimed in claims 1, 2 or 3, characterized by comprising two said latching members each disposed in said first major wall near a respective side wall.

19. A cassette as claimed in claims 16 or 17, characterized by comprising two said latching members disposed in said first major wall, spaced from each other.

* * * * *